E. MITSCHLER.
DOUGH SHAPING IMPLEMENT.
APPLICATION FILED MAR. 19, 1913.
1,076,509.  Patented Oct. 21, 1913.
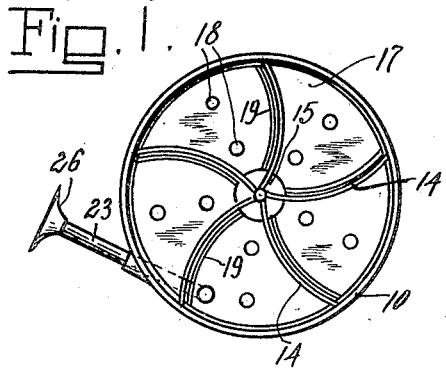
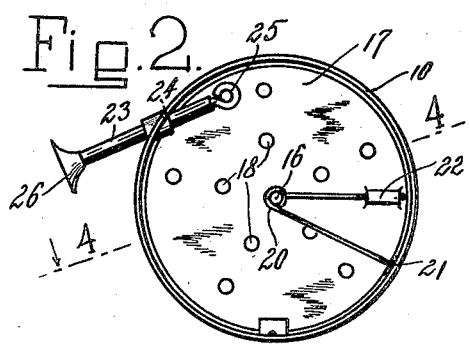
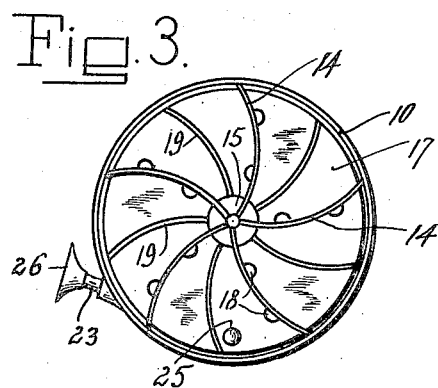
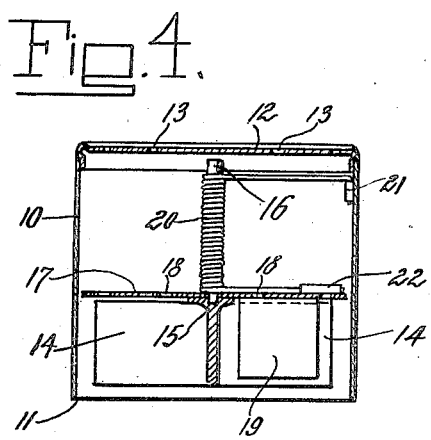
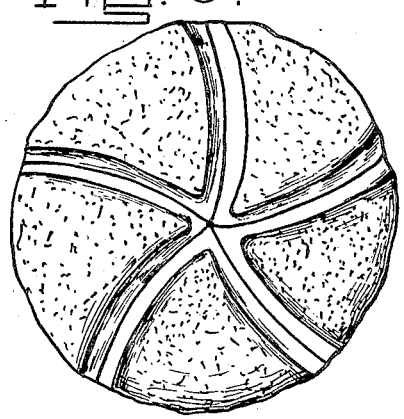

UNITED STATES PATENT OFFICE.

EUGENE MITSCHLER, OF NEW YORK, N. Y.

DOUGH-SHAPING IMPLEMENT.

1,076,509.   Specification of Letters Patent.   Patented Oct. 21, 1913.

Application filed March 19, 1913. Serial No. 755,512.

*To all whom it may concern:*

Be it known that I, EUGENE MITSCHLER, a subject of the German Emperor, and resident of the city of New York, in the county of New York and State of New York, have invented certain new and useful Improvements in Dough-Shaping Implements, of which the following is a specification.

The present invention relates to a dough shaping implement, and more particularly to a device adapted to be used for the production of breakfast rolls which are known in the trade as "Vienna rolls".

"Vienna rolls" are provided in their upper sides or tops with a plurality of substantially radially extending grooves or indentations which are formed in the dough either by means of a blade-like instrument or by the aid of the fingers of the operator. The grooving of the rolls takes quite some time, as there are obviously as many strokes of the blade-instrument or of the fingers to be made as there are grooves to be formed; moreover highly skilled operators or bakers are needed for the production thereof.

One of the objects of the present invention is to provide a simple and inexpensive device, whereby the grooving of the lumps or balls of dough which are subsequently baked into rolls may be effected expeditiously even by unskilled laborers.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a bottom plan view of the implement; Fig. 2 is a top plan view thereof, its cover being removed to more clearly show the interior construction; Fig. 3 is also a bottom plan view of the device, its parts occupying positions differing from those shown in Fig. 1; Fig. 4 is a vertical section taken on line 4—4 of Fig. 2; Fig. 5 is a plan view of a "Vienna roll"; and Fig. 6 is a side elevation thereof.

The implement comprises a cylindrical receptacle 10, which is open at its lower end 11, that is to say it lacks the bottom, and is provided with a cover 12 at its upper end, said cover being secured to said receptacle in any suitable manner and provided with a plurality of perforations 13, 13, for a purpose hereinafter to be described. The inner diameter of this receptacle corresponds to that of the lump or ball of dough which is to be shaped into a "Vienna roll". The receptacle has a plurality of vertical, substantially radially extending partitions 14, 14, such partitions being attached at their outer ends to the inner face of the cylindrical wall of the receptacle and joined at their inner ends in the vertical axis of the receptacle. These partitions do not extend throughout the entire height of the receptacle, but begin below the middle portion thereof and project toward its lower end 11, stopping short of such end, as clearly shown in Fig. 4 of the drawings. The inner joined ends of the partitions form a hub-like structure 15, from which rises upward toward the cover 12 a pin 16, such pin being fixedly attached to the hub in any suitable manner. On this pin is oscillatably mounted a horizontal disk 17, also provided with a plurality of perforations, denoted by the numerals 18, 18. The diameter of this disk is slightly smaller than the inner diameter of the receptacle 10. To the disk are secured a plurality of downwardly projecting, vertical, substantially radially extending vanes 19, the configuration and number of which are similar to those of the partitions 14. The vanes are held against their respective partitions by means of a spring 20, which is coiled upon the pin 16; one end of said spring being attached at 21 to the receptacle 10 and its other end at 22 to the disk 17.

A push rod 23 extends through an aperture 24 in the wall of the receptacle 10 in a substantially tangential direction to the periphery of the disk 17. The inner end of this push rod is pivoted at 25 to the disk 17, its outer end, which is arranged outside of the receptacle 10, being provided with a knob 26.

The operation of this device is as follows: A lump or ball of dough, which is to be grooved or indented, is placed upon a support, the implement with its open end put on top of it and forced toward the said support. The air displaced by the dough is adapted to escape through the perforations 18 and 13 in the disk 17 and the cover 12, respectively. By the operation described, the partitions 14 and vanes 19 are lowered into the lump or ball of dough, and, inasmuch as the said partitions and vanes stop short of the lower end of the receptacle, a dividing of the lump or ball of dough will be prevented. The push rod 23 is then forced inward (Fig. 4), thereby imparting a turn through a corresponding angular distance to the disk 17 and the vanes 19 carried thereby, forming thus radially extending grooves or indentations in the upper side of said lump or ball. The push rod is then released, whereby the spring restores the parts to their normal positions, in which the implement is removed from the dough. The lump or ball is then set away in pans, or otherwise, to permit a second raising to take place before the baking operation. During this raising, the grooves or indentations formed in the dough are somewhat shallowed, and assume the appearance of handmade grooves.

What I claim is:—

1. In an implement of the character described, the combination with a cylindrical receptacle having an open lower end, of a plurality of vertical substantially radially extending partitions therein, said partitions stopping short of the lower end of said receptacle, a corresponding number of vertical substantially radially extending vanes in said receptacle, means for holding said vanes normally against their respective partitions, and hand-operated means for causing said vanes to move away from said partitions against the action of said first mentioned means.

2. In an implement of the character described, the combination with a cylindrical receptacle having an open lower end, of a plurality of vertical substantially radially extending partitions therein, said partitions stopping short of the lower end of said receptacle, a corresponding number of vertical substantially radially extending vanes in said receptacle, a spring for holding said vanes normally against their respective partitions, and hand-operated means for causing said vanes to move away from said partitions against the action of said spring.

3. In an implement of the character described, the combination with a cylindrical receptacle having an open lower end, of a plurality of vertical substantially radially extending partitions therein, said partitions stopping short of the lower end of said receptacle, a disk oscillatably mounted above said partitions in said receptacle, a plurality of vertical substantially radially extending vanes attached to said disk projecting downward toward the open end of said receptacle, said vanes corresponding in number to that of said partitions, a spring fastened to said disk and said receptacle for holding said vanes normally against their respective partitions, and hand-operated means for causing said vanes to move away from said partitions against the action of said spring.

Signed at New York, in the county of New York and State of New York, this 4th day of March, A. D. 1913.

EUGENE MITSCHLER.

Witnesses:
 SIGMUND HERZOG,
 S. BIRNBAUM.